UNITED STATES PATENT OFFICE.

WILHELM HASENBACH, OF MANNHEIM, GERMANY.

PROCESS OF MAKING SODIUM CARBONATE.

951,243.      Specification of Letters Patent.      Patented Mar. 8, 1910.

No Drawing. Original application filed November 1, 1907, Serial No. 400,207. Divided and this application filed March 10, 1908. Serial No. 420,204.

*To all whom it may concern:*

Be it known that I, WILHELM HASENBACH, a subject of the German Emperor, residing at Mannheim, Germany, have invented certain new and useful Improvements in Processes of Making Sodium Carbonate, of which the following is a specification.

The present invention relates to an improved process for treating sodium sulfid to obtain therefrom (*a*) sodium carbonate free from water and (*b*) practically pure hydrogen sulfid. Dry pulverulent sodium sulfid is mixed intimately with almost the equivalent quantity of dry pulverulent sodium bicarbonate without any addition of liquid water, which dry mixture is heated while steam is passed over it. The temperature to which the mixture is heated is from 115° to 130° centigrade. The desired reaction occurs more rapidly if the mixture is heated to a temperature of 130°.

Carbonate of soda is obtained quite free from sodium sulfid and water, and almost pure sulfureted hydrogen according to the equation

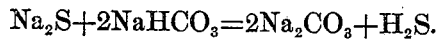

$$Na_2S + 2NaHCO_3 = 2Na_2CO_3 + H_2S.$$

The hydrogen sulfid may be used for many industrial purposes, for instance for the manufacture of sulfur in accordance with the Chance process.

I prefer to employ besides the bicarbonate the dry mixture of sodium sulfid and carbon obtained by a process which is described in another application for U. S. Letters Patent filed November 1, 1907, Serial No. 400,207. Briefly stated, this process consists in mixing sodium sulfate and finely ground carbonaceous matter in such proportion that the quantity of carbon in the mixture is equal to one part by weight of carbon to about one and one-half parts of sodium sulfate, grinding the mixture and then heating the same to a suitable temperature in a closed vessel. In this case the excess of carbon may be removed by dissolving the carbonate of soda and the carbon may be used for many industrial purposes.

Although in the foregoing specification the use of dry bicarbonate of soda has been spoken of, I wish it to be understood that the use of a bicarbonate containing a small amount of natural moisture as for instance, the bicarbonate obtained in the ammonia-soda manufacture, may be also used in the above described reaction and is within the scope of the present invention, the said slight amount of moisture going off with the steam passed over the mixture so that also in this case the dry, pure pulverulent sodium carbonate, and pure hydrocarbon sulfid are obtained.

I claim.—

The herein described process of manufacturing sodium carbonate free from sulfid and water and almost pure hydrogen sulfid consisting in intimately mixing dry pulverulent sodium sulfid with an approximately equivalent quantity of substantially dry sodium bicarbonate and heating said dry mixture while steam is passed over it.

In testimony whereof I have signed my name to this specification in the presence of two subscribing witnesses.

WILHELM HASENBACH.

Witnesses:
     ALBERT SCHULE,
     JOS. H. LEUTE.